April 29, 1958 L. D. CARUFEL 2,832,654
PISTON
Filed Oct. 12, 1953 2 Sheets-Sheet 1
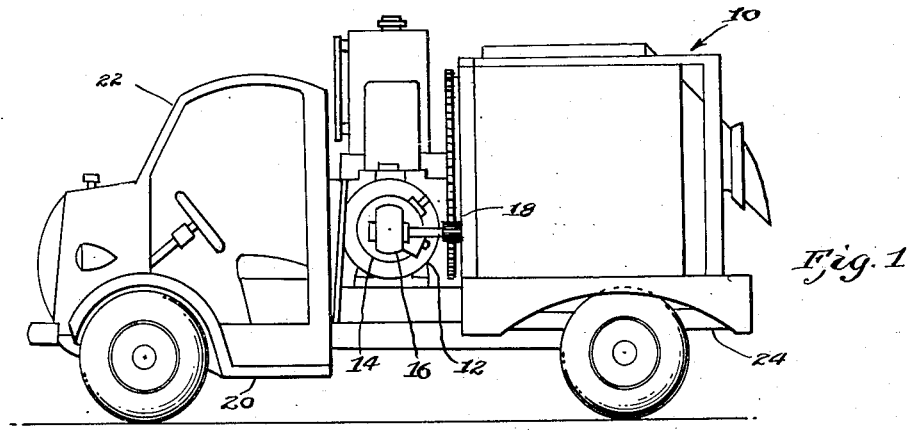
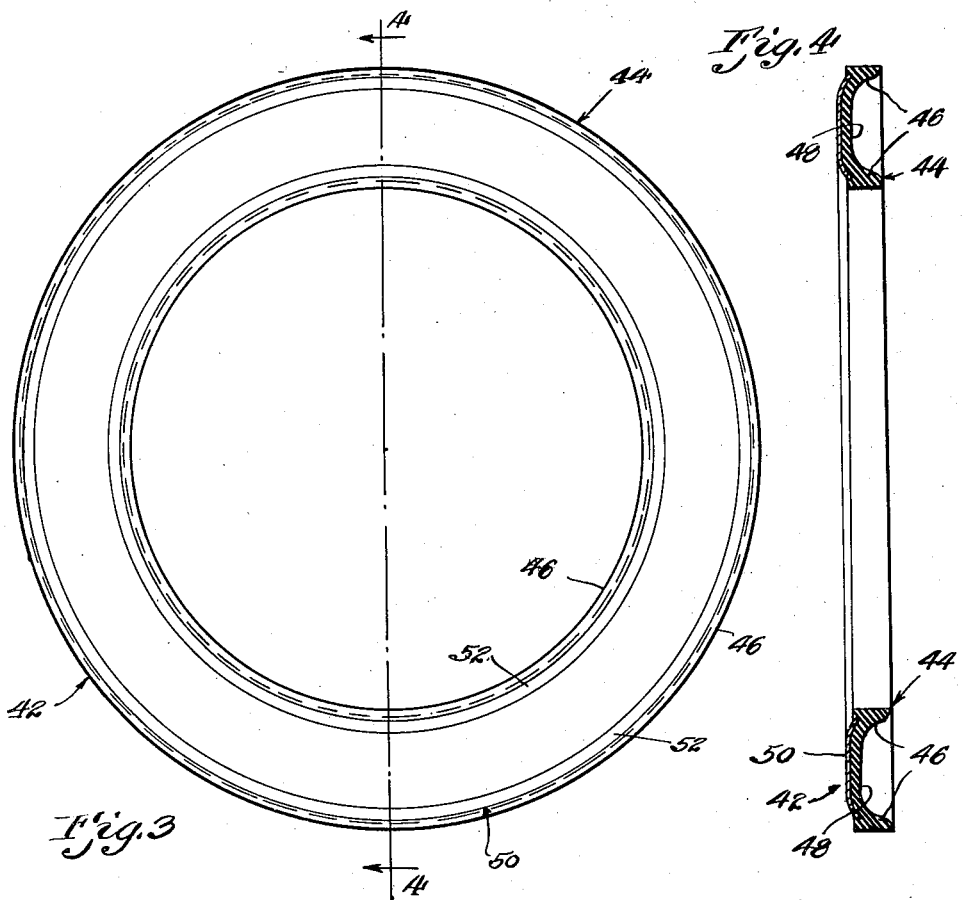
INVENTOR.
Louis D. Carufel
BY
Attorneys

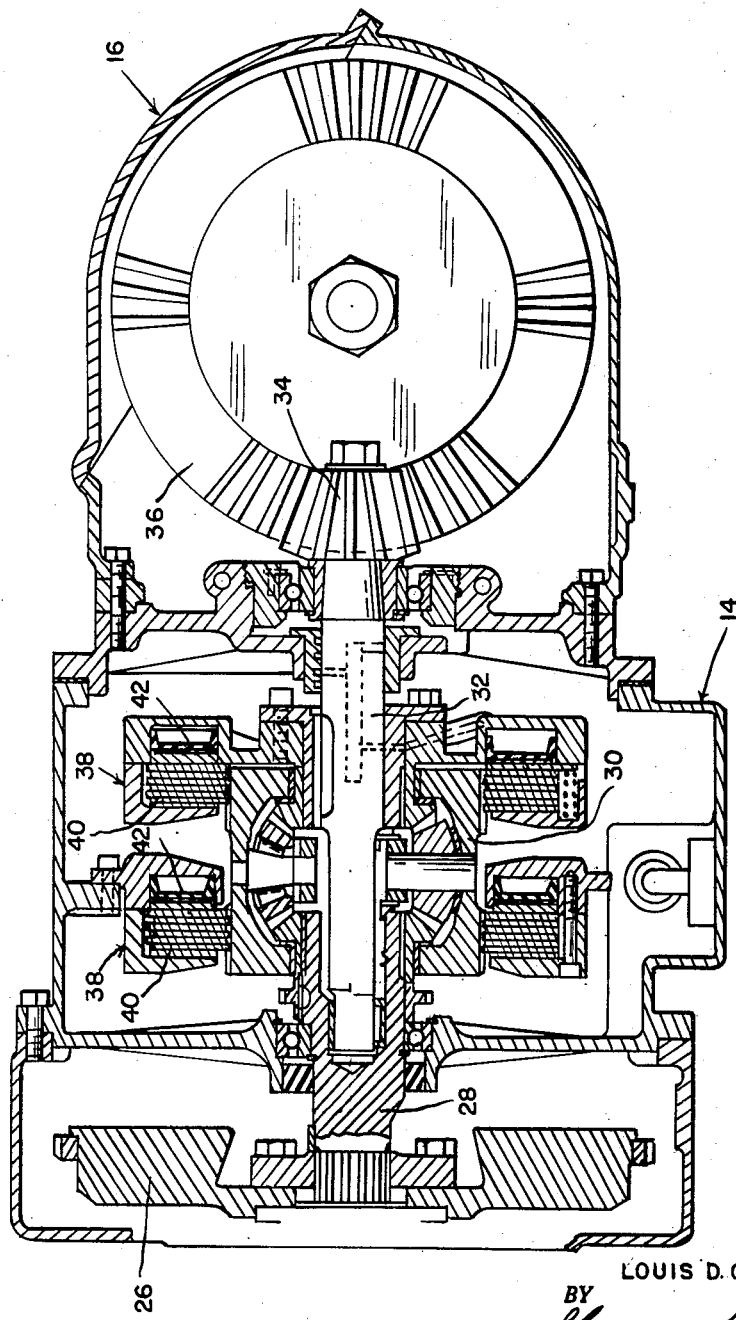

2,832,654
PISTON

Louis D. Carufel, Muskegon, Mich., assignor to Continental Motors Corporation, Detroit, Mich., a corporation of Virginia Application October 12, 1953, Serial No. 385,503

2 Claims. (Cl. 309—4)

This invention relates to a novel and inventive transmission and more particularly to a piston and cylinder assembly for operating a transmission clutch mechanism embodying a piston of simplified construction. More particularly the piston as defined herein provides a resilient or rubber bearing surface and a stiffening back plate.

An object of the invention is the provision of a novel piston formed of a metal backed rubber annular ring having great strength, and being resistant to distortion.

Other features of the construction will become more apparent as the description of the invention unfolds below. For a visual understanding of the invention, reference may be had to the accompanying drawings in which like parts are referred to by like reference numerals throughout the several views illustrating a preferred embodiment of the invention, and in which Fig. 1 is a reduced side elevational view of a portable cement mixer and tractor in which the inventive construction is embodied.

Fig. 2 is a vertical sectional view of the transmission device of Fig. 1.

Fig. 3 is an elevational view of the piston used in the transmission of Fig. 2, and Fig. 4 is a vertical sectional view of the piston on the line 4—4 of Fig. 3.

As seen in Fig. 1, a power driven cement mixer 10 is driven by an internal combustion engine 12 through a transmission 14, right angle drive mechanism 16 and a pinion and gear set 18 directly attached to mixer 10. The entire mechanism is mounted on a tractor 20 consisting of a motor and cab section 22 and a mixer carrying portion 24 rearward of the cab.

The arrangement of the portable cement mixer 10 on the tractor 20 is well known in the art and it is to be understood that no claims are made to the relationship of these units. The invention resides particularly in the transmission 14 which will be described in more detail immediately below.

By reference to Fig. 2, it will be seen that the motor driven flywheel 26 is affixed to transmission input shaft 28, which in turn drives a reverse gear planetary device 30, turning output shaft 32 in driving connection, through pinion 34, with right angle ring gear 36. Ring gear 36 is directly connected at its axis with pinion and gear set 18.

The direction of rotation of output shaft 32 is determined by clutches 38 which comprise driven and driving plates 40, functionally operated by piston 42. It will be seen more clearly in Figs. 3 and 4 that piston 42 consists of an annular ring 44 of a rubber-like material in the shape of a grooved ring having spaced sides or flanges 46 of tapering section connected by a web or base portion 48, very much like a channel form. An annular ring 50 of metal having inturned flanges 52 is bonded to ring 44 and by having flanges 52 partially embedded in the ring sides 46. The steel backing element 50 provides great strength to piston 42 and enables it to function with very little distortion in applying pressure to the clutch plates 40. Of course, the metal ring 50 may also be molded directly within the annular ring 44, so that it is not in direct contact with clutch plates 40. The functional operation of piston 42 would however remain substantially the same. The flexible portion 42 provides peripheral flanges having peripheral surfaces in wearing contact with the cylinder walls on reciprocation of the piston.

It will be apparent to those skilled in the art to which the invention pertains that various modifications and changes may be made without departing from the spirit of the invention or from the scope of the appended claims.

I claim:

1. In a hydraulically operated clutch mechanism having clutch elements and a piston and cylinder assembly, a hydraulically actuated piston operable in the cylinder for actuating said clutch elements and comprising a channel shaped flexible annular ring structure provided with a base portion and peripheral flange portions having outer surfaces in wearing contact with the cylinder, and a rigid backing ring bonded to said base portion for retaining said base portion in a substantially flat plane, the peripheral edges of said backing ring being offset inwardly from the peripheral edges of said base portion to space said backing ring edges from said cylinder, said backing ring having inner and outer turned in peripheral flanges.

2. In a hydraulically operated clutch mechanism having clutch elements and a piston and cylinder assembly, a hydraulically actuated piston operable in the cylinder for actuating said clutch elements and comprising a channel shaped flexible annular ring structure provided with a base portion and peripheral flange portions having outer surfaces in wearing contact with the cylinder, and a channel-shaped rigid backing ring bonded only to said base portion for retaining said base portion in a substantially flat plane, the edge portions of said channeled backing ring being inwardly offset from the periphery of said base portion to space said backing ring edges from said cylinder and being partially embedded into the flexible annular ring structure.

References Cited in the file of this patent

UNITED STATES PATENTS

| | | |
|---|---|---|
| 980,423 | Kirchen | Jan. 3, 1911 |
| 2,059,729 | Dick | Nov. 3, 1936 |
| 2,067,499 | Millmine | Jan. 12, 1937 |
| 2,076,363 | Brunner | Apr. 6, 1937 |
| 2,081,040 | King | May 18, 1937 |
| 2,081,575 | Carroll | May 25, 1937 |
| 2,188,106 | Caldwell | Jan. 23, 1940 |
| 2,198,129 | Sanford et al. | Apr. 23, 1940 |
| 2,218,616 | McCune et al. | Oct. 22, 1940 |
| 2,261,962 | Christenson | Nov. 11, 1941 |
| 2,356,899 | Stutter | Aug. 29, 1944 |
| 2,371,828 | Kuhns | Mar. 20, 1945 |
| 2,387,181 | Procter | Oct. 16, 1945 |
| 2,547,038 | Parrish | Apr. 3, 1951 |